(12) United States Patent
Rai et al.

(10) Patent No.: US 9,599,043 B2
(45) Date of Patent: Mar. 21, 2017

(54) METHOD AND DEVICE FOR CONTROLLING AN INTERNAL COMBUSTION ENGINE

(71) Applicants: Karthik Rai, Stuttgart (DE); Stefan Hoefle, Eppingen (DE)

(72) Inventors: Karthik Rai, Stuttgart (DE); Stefan Hoefle, Eppingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 201 days.

(21) Appl. No.: 14/349,927

(22) PCT Filed: Sep. 21, 2012

(86) PCT No.: PCT/EP2012/068601
§ 371 (c)(1),
(2) Date: Apr. 4, 2014

(87) PCT Pub. No.: WO2013/050256
PCT Pub. Date: Apr. 11, 2013

(65) Prior Publication Data
US 2014/0278004 A1    Sep. 18, 2014

(30) Foreign Application Priority Data

Oct. 6, 2011   (DE) .................. 10 2011 084 079
Sep. 20, 2012  (DE) .................. 10 2012 216 934

(51) Int. Cl.
  *F02D 41/00*   (2006.01)
  *F02D 41/04*   (2006.01)
  *F02N 11/08*   (2006.01)

(52) U.S. Cl.
  CPC ....... *F02D 41/0002* (2013.01); *F02D 41/042* (2013.01); *F02N 11/0844* (2013.01); *F02N 11/0855* (2013.01); *Y02T 10/42* (2013.01)

(58) Field of Classification Search
  CPC ............... F02D 41/0002; F02D 41/042; F02N 11/0844; F02N 11/0855; Y02T 10/42
  (Continued)

(56) References Cited

U.S. PATENT DOCUMENTS 5,076,059 A * 12/1991 Okada .................. F02B 37/10
                                                    123/198 DB
7,079,941 B2 * 7/2006 Tetsuno .............. F02N 11/0814
                                                    123/179.5
(Continued)

FOREIGN PATENT DOCUMENTS

EP    1403512 A1    3/2004
EP    1582738      10/2005
(Continued)

OTHER PUBLICATIONS

International Search Report for PCT/EP2012/068601, issued on Feb. 19, 2013.

*Primary Examiner* — Hung Q Nguyen
*Assistant Examiner* — Susan E Scharpf
(74) *Attorney, Agent, or Firm* — Gerard Messina

(57) ABSTRACT

A method for stopping an internal combustion engine, in which an air flow supplied via an air metering device, in particular a throttle valve of the internal combustion engine, is reduced after a stopping request has been ascertained, an undershoot point in time is ascertained, at which an ascertained speed of the internal combustion engine falls below a pre-definable speed threshold value, after the undershoot point in time, the air flow supplied via the air metering device of the internal combustion engine is increased again, the predefinable speed threshold value being selected in such a way that an intake cylinder no longer enters a compression stroke after the increase of the supplied air flow until the internal combustion engine is at a standstill, a degree of opening of the air metering device to increase the supplied (Continued)

air flow being selected as a function of a coasting speed of the internal combustion engine.

18 Claims, 6 Drawing Sheets

(58) Field of Classification Search
 USPC .................................. 701/103; 123/198 DB
 See application file for complete search history.

(56) References Cited

U.S. PATENT DOCUMENTS

| | | | | |
|---|---|---|---|---|
| 2004/0153235 | A1* | 8/2004 | Kataoka | ................ B60K 6/485 701/112 |
| 2005/0221952 | A1* | 10/2005 | Tetsuno | .............. F02N 11/0814 477/115 |
| 2006/0065223 | A1* | 3/2006 | Freisinger | ............... F02D 17/04 123/179.4 |
| 2006/0129305 | A1* | 6/2006 | Nishikawa | ............ F02D 41/042 701/112 |
| 2010/0212629 | A1* | 8/2010 | McDonald | .............. F02D 13/06 123/348 |
| 2011/0208411 | A1* | 8/2011 | Tsuji | .................... F02D 41/0005 701/112 |
| 2013/0166177 | A1* | 6/2013 | Calva | .................. F02D 41/0002 701/103 |
| 2013/0231849 | A1* | 9/2013 | Rai | ..................... F02D 41/0002 701/112 |
| 2015/0019109 | A1* | 1/2015 | Trofimov | .............. F02D 41/042 701/102 |

FOREIGN PATENT DOCUMENTS

| | | |
|---|---|---|
| EP | 2345807 | 7/2011 |
| JP | 2006242082 | 9/2006 |

* cited by examiner

METHOD AND DEVICE FOR CONTROLLING AN INTERNAL COMBUSTION ENGINE

BACKGROUND INFORMATION

A method for stopping an internal combustion engine is known from German Published Patent Appln. No. 10 2010 040 559 (no prior publication), in which an air flow supplied via an air metering device, in particular a throttle valve of the internal combustion engine, is reduced after a stopping request has been ascertained, and the air flow supplied via the air metering device of the internal combustion engine is increased again if a detected speed of the internal combustion engine falls below a predefinable speed threshold value, an intake cylinder to which the air flow is supplied no longer entering a power stroke after the increase of the supplied air flow.

SUMMARY

In particular in so-called change-of-mind cases, in which a restart request of the driver is ascertained during the coasting of the internal combustion engine, it is desirable to engage a starter as rapidly as possible, to allow a rapid restart of the internal combustion engine. For this purpose, it is important for the point in time for engagement to be determinable early as precisely as possible and in the most predictive way possible. Engagement is possible both in the forward rotational direction and in the reverse rotational direction of the internal combustion engine, as soon as the speed of the internal combustion engine has slowed sufficiently.

The speed of the internal combustion engine during the coasting is a measure of the kinetic rotational energy of the internal combustion engine. The kinetic rotational energy of the internal combustion engine is dissipated as it coasts and is therefore a measure of the duration of the coasting. Therefore, if the speed of the internal combustion engine is ascertained at a defined point in time, for example, during the passage through a top dead center of a cylinder, a measure of the duration of the coasting of the internal combustion engine is hereby provided directly by this speed ascertained at the defined point in time. This speed ascertained at the defined point in time is referred to hereafter as the coasting speed. The term coasting speed may also be understood in this case to mean that it includes similarly defined measures of the kinetic rotational energy of the internal combustion engine, for example, the square of the coasting speed. It is only important in this case that the kinetic rotational energy may be determined unambiguously from the similarly defined measure.

It is known from the related art that an increased air charge is supplied to the intake cylinder by the opening of the air metering device, while the cylinder which has passed through the intake stroke before the intake cylinder would be supplied a significantly smaller air charge. In this way, a decelerating torque results in sum due to the compression of the air spring in the intake cylinder when the intake cylinder enters a compression stroke. This decelerating torque ensures that the intake cylinder no longer enters the power stroke, but rather the rotational movement of the internal combustion engine experiences a rotational direction reversal even before this and swings back. If the air metering device is opened equally far independently of the coasting speed, the duration of the coasting procedure may be determined in principle from the coasting speed, but the method is not robust and complex.

The present invention having the features of the independent claims has the advantage over the known related art that because the coasting speed is ascertained and a degree of opening of the air metering device is selected as a function of the coasting speed, it is possible to determine a point in time at which engagement of the starter to restart the internal combustion engine is possible in a simple way. It is thus possible in particular to ensure a particularly rapid restart of the internal combustion engine in particular in "change-of-mind" situations.

The coasting speed may be determined particularly simply when one of the cylinders passes through a top dead center. If this top dead center is the closest top dead center after an undershoot point in time, a possible closest engagement point in time may be determined as early as possible. The undershoot point in time refers in this case to the point in time at which a detected speed of the internal combustion engine has fallen below a predefinable speed threshold value.

In particular, the coasting duration, i.e., the duration which begins at the point in time at which the intake cylinder enters a compression stroke for the last time before swinging back, and ends at the point in time at which the swinging back begins, i.e., at which the rotational direction reverses for the first time, may be determined particularly simply. The relationship between the coasting duration and coasting speed may be freely determined in broad limits by the selection of the degree of opening of the air metering device as a function of the coasting speed. It is particularly advantageous if a monotonously decreasing relationship results between these two variables, i.e., if the coasting speed decreases or remains constant with the coasting duration. This allows a particularly robust prediction method of the point in time at which engagement is possible.

Engagement is possible in particular if the rotational direction corresponds to the reverse rotational direction of the internal combustion engine, i.e., a rotational direction which is opposite to the normal rotational direction during fired operation of the internal combustion engine. In such a case, there is a swinging back point in time, at which the internal combustion engine reverses its rotational direction. This rotational direction reversal is an easily detectable event, and represents an additional trigger for the engine controller, with the aid of which the engagement procedure may be devised robustly.

The engagement method may be devised particularly robustly if the engagement corresponds to a zero crossing of the speed of the internal combustion engine. Engagement may be performed at such a point in time particularly robustly and using particularly simple means.

A prediction method for the next possible engagement point in time is particularly simple and robust if the degree of opening of the air metering device is selected as a function of the coasting speed in such a way that the relationship between a variable which characterizes the coasting speed and the coasting duration is linearly decreasing, i.e., if the coasting duration decreases linearly with the increasing variable which characterizes the coasting speed.

The coasting speed is advantageously linked in a very simple way to the variable which characterizes the coasting speed, for example, in that it is given by the kinetic rotational energy of the internal combustion engine, it is given by the second coasting speed itself, or this variable which characterizes the coasting speed is given as a polynomial of the coasting speed. In these cases, the variable which characterizes the coasting speed may be ascertained by computer particularly simply.

In order that the desired relationship results between the variable which characterizes the coasting speed and the coasting duration, the functional curve of the degree of opening of the air metering device as a function of the ascertained coasting speed advantageously has the following form: in a first range of low coasting speed, the degree of opening decreases as a function of the coasting speed, in a second range of moderate coasting speed, the degree of opening as a function of the coasting speed is approximately constant, and in a third range of high coasting speed, the degree of opening as a function of the coasting speed increases.

Such a behavior may also be described concisely, for example, by observing the derivative of the degree of opening of the air metering device as a function of the coasting speed. If the coasting speed is less than a first range threshold, this derivative is negative, advantageously less than a negative derivative threshold. If the coasting speed is not less than the first range threshold and is greater than a second range threshold, this derivative is approximately equal to zero, i.e., not less than the negative derivative threshold and less than a positive derivative threshold. If the coasting speed is greater than or equal to the second range threshold, the derivative is greater than or equal to the positive derivative threshold.

The method according to the present invention is advantageously implemented as a computer program, and is stored on an electrical storage medium for a control and/or regulating unit of the internal combustion engine, so that the control and/or regulating unit is therefore programmed in such a way that it is capable of carrying out the method according to the present invention.

FIELD OF THE INVENTION

FIG. 1 shows the view of a cylinder of an internal combustion engine.

FIG. 2 schematically shows the curve of several characteristic variables as the method according to the present invention is carried out.

Figure 5:
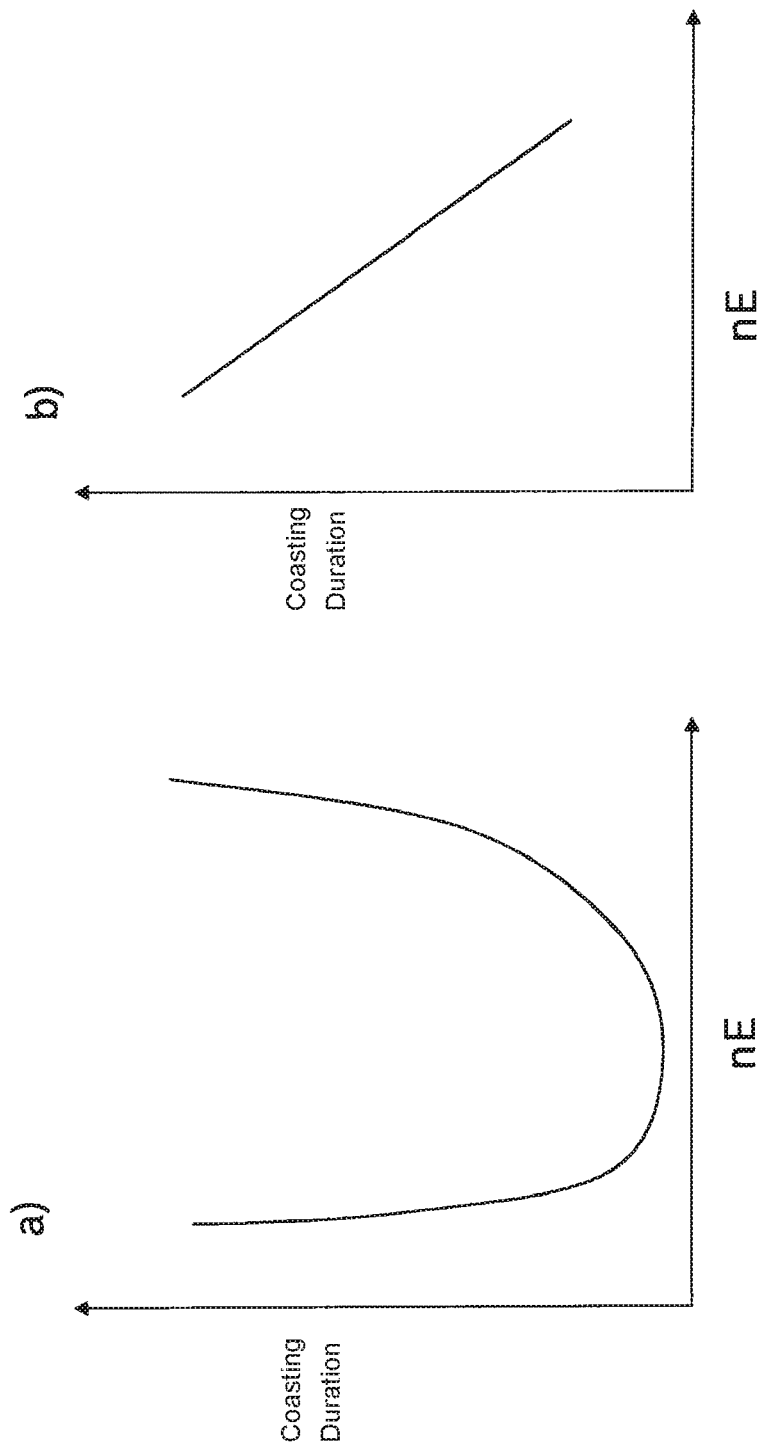

FIG. 5 schematically shows two different curves of the coasting duration as a function of the ascertained second speed.

Figure 6:
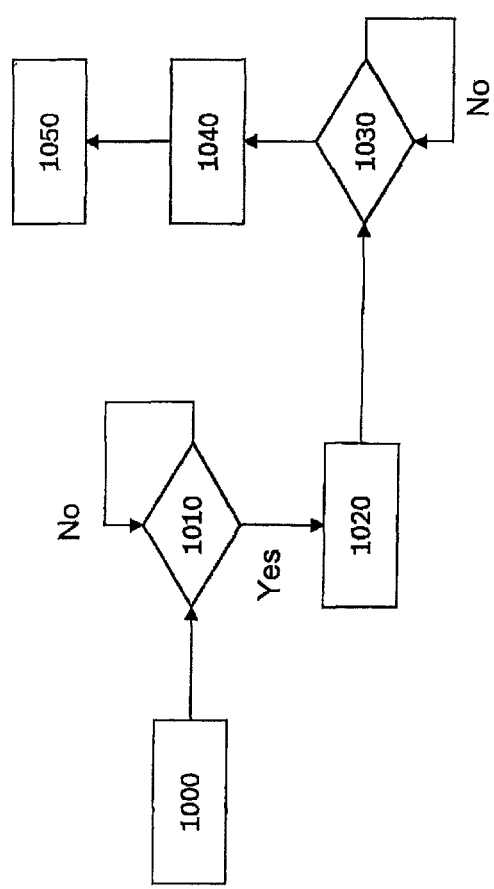

FIG. 6 shows the sequence of the method according to the present invention.

DETAILED DESCRIPTION

Figure 1:
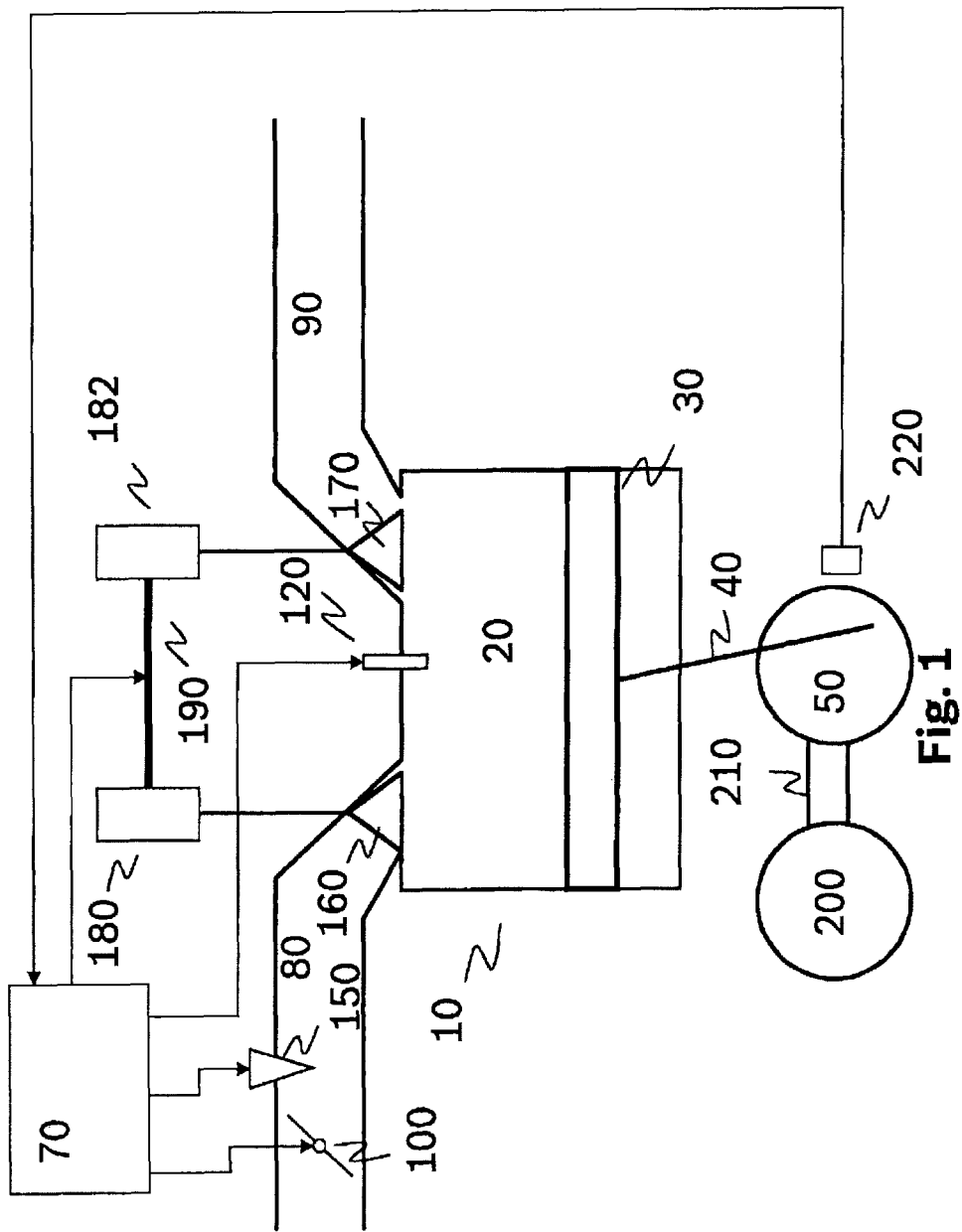

FIG. 1 shows a cylinder 10 of an internal combustion engine having a combustion chamber 20, and a piston 30, which is connected to a crankshaft 50 using a connecting rod 40. Piston 30 carries out an upward and downward movement in a known way. The reversal points of the movement are referred to as dead centers. The transition from the upward movement into the downward movement is referred to as top dead center; the transition from the downward movement to the upward movement is referred to as bottom dead center. An angular position of crankshaft 50, a so-called crankshaft angle, is normally defined in relation to top dead center. A crankshaft sensor 220 detects the angular position of crankshaft 50.

Air to be combusted is inducted into combustion chamber 20 via an intake manifold 80 in a known way during a downward movement of piston 30. This is referred to as the induction stroke or intake stroke. The combusted air is discharged out of combustion chamber 20 via an exhaust pipe 90 during an upward movement of piston 30. This is normally referred to as an exhaust stroke. The flow rate of the air inducted via intake manifold 80 is set via an air metering device, in the exemplary embodiment a throttle valve 100, whose position is determined by a control unit 70.

Fuel is injected into the air inducted from intake manifold 80 via an intake manifold injector 150, which is situated in intake manifold 80, and a fuel-air mixture is generated in combustion chamber 20. The amount of fuel injected by intake manifold injector 150 is determined by control unit 70, normally via the duration and/or the strength of an activation signal. A spark plug 120 ignites the fuel-air mixture.

An intake valve 160 on the connection of intake manifold 80 to combustion chamber 20 is driven via cams 180 of a camshaft 190. An outlet valve 170 on the connection of exhaust pipe 90 to combustion chamber 20 may also be driven via cams 182 of camshaft 190. Camshaft 190 is coupled to crankshaft 50. Camshaft 190 normally carries out one revolution per two revolutions of crankshaft 50. Camshaft 190 is designed in such a way that outlet valve 170 opens during the exhaust stroke and closes close to top dead center. Intake valve 160 opens close to top dead center and closes during the intake stroke. A phase in which outlet valve 170 and inlet valve of a cylinder are open simultaneously is referred to as valve overlap. Such a valve overlap is used, for example, for the internal exhaust gas recirculation. Camshaft 190 may be designed as activatable by control unit 70 in particular, so that different stroke curves of intake valve 160 and outlet valve 170 may be set as a function of the operating parameters of the internal combustion engine. However, it is also possible that intake valve 160 and outlet valve 170 are not moved up and down via camshaft 190, but rather via electrohydraulic valve actuators. In this case, camshaft 190 and cams 180 and 182 may be omitted. Throttle valve 100 is also not necessary in the case of such electrohydraulic valve actuators.

A starter 200 is mechanically connectable via a mechanical coupling 210 to crankshaft 50. The establishment of the mechanical connection between starter 200 and crankshaft 50 is also referred to as engagement. The disengagement of the mechanical connection between starter 200 and crankshaft 50 is also referred to as shedding. The engagement is only possible if the speed of the internal combustion engine is less than a speed threshold value, which is a function of the internal combustion engine and the starter.

Figure 2:
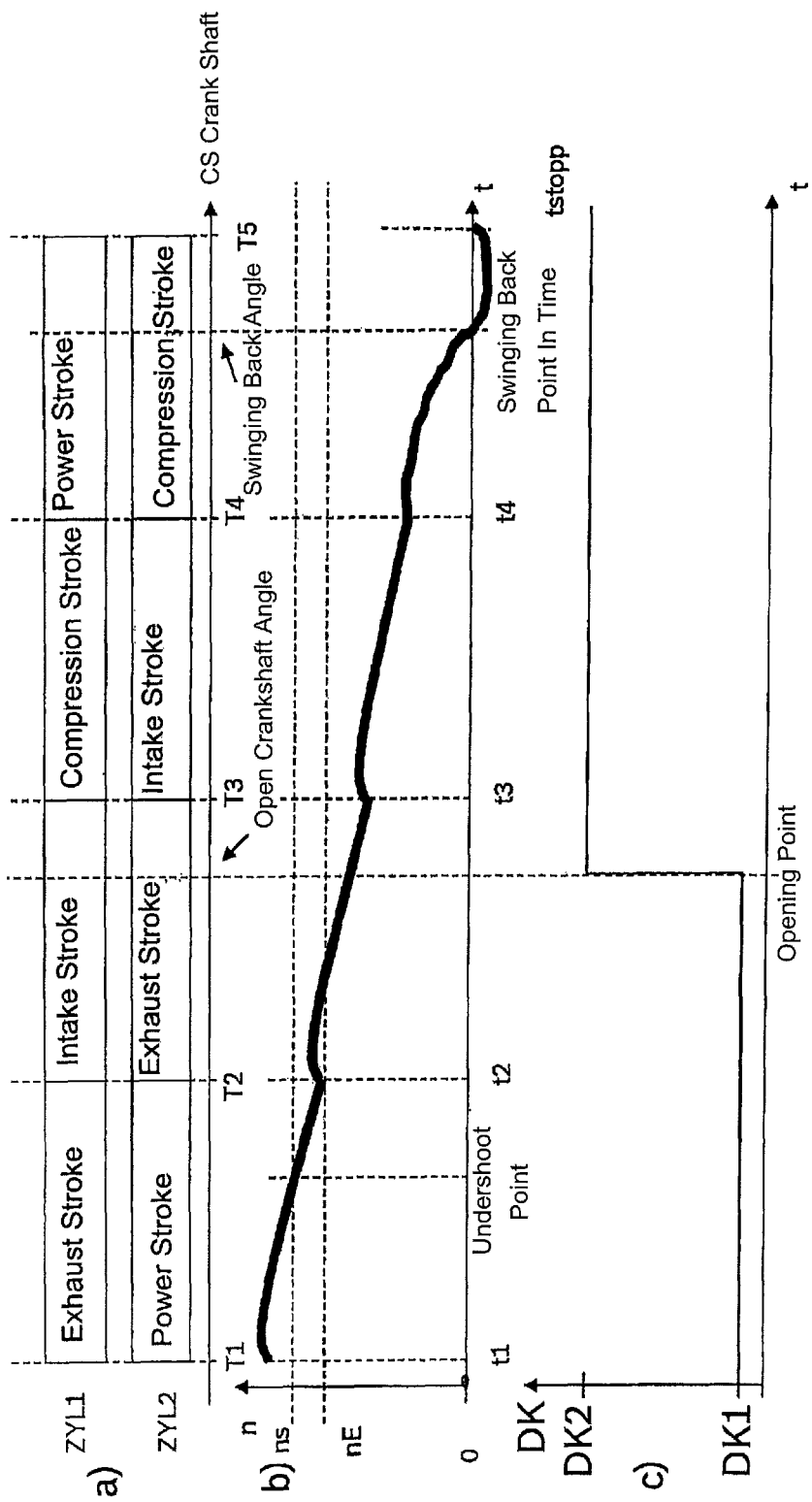

FIG. 2 shows the behavior of the internal combustion engine during stopping of the internal combustion engine. FIG. 2a shows the sequence of the various strokes of a first cylinder ZYL1 and a second cylinder ZYL2, plotted over the angle of crankshaft KW. A first dead center T1, a second dead center T2, a third dead center T3, a fourth dead center T4, and a fifth dead center T5 of the internal combustion engine are plotted. First cylinder ZYL1 passes through the exhaust stroke, the intake stroke, a compression stroke, and a power stroke between these dead centers in a known way. In the exemplary embodiment of an internal combustion engine having four cylinders, the strokes of second cylinder ZYL2 are shifted by 720°/4=180°. With respect to first cylinder ZYL1, first dead center T1, third dead center T3, and fifth dead center T5 are bottom dead centers, and second dead center T2 and fourth dead center T4 are top dead centers. With respect to second cylinder ZYL2, first dead center T1, third dead center T3, and fifth dead center T5 are top dead centers, and second dead center T2 and fourth dead center T4 are bottom dead centers.

FIG. 2b shows, in parallel to the strokes shown in FIG. 2a, the curve of a speed n of the internal combustion engine over time t. Speed n is defined, for example, as the time derivative of crankshaft angle KW. First dead center T1 corresponds to a first point in time t1, second dead center T2 corresponds to a second point in time t2, third dead center T3 corresponds to a third point in time t3, and fourth dead center T4 corresponds to a fourth point in time t4. Between each two successive points in time, for example, between first point in time t1 and second point in time t2, the speed initially increases briefly, then decreases monotonously. The brief speed increase is as a result of the compression of the air charge in the cylinders. A cylinder which passes through a top dead center maximally compresses its air charge, so that compression energy is stored therein. This compression energy is partially converted into rotational energy during the further rotation of the internal combustion engine.

FIG. 2c shows, in parallel to FIG. 2a and FIG. 2b, the time curve of an activation signal DK of throttle valve 100. As is known from the related art, during the stopping of the internal combustion engine, throttle valve 100 is initially closed, which corresponds to a first activation signal DK1. If speed n of the internal combustion engine falls below a speed threshold value ns, for example, 300 RPM, as shown in FIG. 2b, according to the present invention, at an opening point in time tauf, throttle valve 100 is opened, which corresponds to a second activation signal DK2. The point in time at which speed n of the internal combustion engine falls below speed threshold value ns is referred to as undershoot point in time t_unter. In a preferred exemplary embodiment, control unit 70 establishes at top dead center following undershoot point in time t_unter, i.e., second dead center T2, that speed n has fallen below speed threshold value ns. Opening point in time tauf is then determined.

Opening point in time tauf is selected in such a way that it occurs close to the third dead center, for example, shortly after third dead center T3. Third dead center T3 is the second following dead center after speed n of the internal combustion engine has fallen below speed threshold value ns (or the next dead center after control unit 70 has established that speed n has fallen below speed threshold value ns). After third dead center T3, second cylinder ZYL2 enters its intake stroke. Opening point in time tauf is also selected in such a way that it occurs immediately after the point in time at which intake valve 160 of second cylinder ZYL2 is opened. It may also be selected in such a way that it is before third dead center T3 by a priority angle theta, if theta is selected in such a way that intake valve 160 of first cylinder ZYL1, which enters its intake stroke immediately before second cylinder ZYL2, is already closed again. This latter case is illustrated in FIG. 2b.

Second cylinder ZYL2 enters the intake stroke at third dead center T3. It is therefore also referred to hereafter as intake cylinder ZYL2. In the exemplary embodiment, opening point in time tauf coincides with the end of the valve overlap of the intake cylinder, i.e., with the point in time of the closing of outlet valve 170 of intake cylinder ZYL2. With respect to top dead center of intake cylinder ZYL2, opening point in time tauf corresponds to an opening crankshaft angle KWauf. To ascertain the point in time at which speed n of the internal combustion engine has fallen below speed threshold value ns, speed n of the internal combustion engine may be monitored continuously. Since the increase of speed n of the internal combustion engine after the dead centers is small, an opening point in time tauf should lie shortly after a dead center; however, it is also possible to check at every dead center of the internal combustion engine whether speed n of the internal combustion engine has fallen below speed threshold ns. In the exemplary embodiment illustrated in FIG. 2b, it is recognized at first point in time t1 that speed n of the internal combustion engine has not yet fallen below speed threshold ns. At second point in time t2, it is recognized for the first time here that speed n of the internal combustion engine has fallen below speed threshold ns, and throttle valve 100 is opened. Coasting speed nE is ascertained at this second point in time.

Due to the opening of throttle valve 100, a large amount of air flows into the intake cylinder during the intake stroke. If intake cylinder ZYL2 enters the compression stroke after fourth point in time t4, the compression work to be performed on the air charge, which is greatly increased in relation to the remaining cylinders, exceeds the compression energy released in the expanding cylinders and speed n of the internal combustion engine decreases rapidly, until it decreases to zero at a swinging back point in time tosc. The rotational movement of crankshaft 50 now changes direction, and speed n of the internal combustion engine becomes negative. Swinging back point in time tosc corresponds to a swinging back angle RPW of crankshaft 50, which is indicated in FIG. 2a. At a stopping point in time tstopp, the internal combustion engine stops. It is to be noted that the illustration of the time axis is nonlinear. Corresponding to the decrease of speed n of the internal combustion engine, the time interval between third point in time t3 and fourth point in time t4 is greater than the time interval between second point in time t2 and third point in time t3, which is in turn greater than the time interval between first point in time t1 and second point in time t2. Fifth dead center T5 of the internal combustion engine is not reached. In the time interval between swinging back point in time tosc and stopping point in time tstopp, crankshaft 50 carries out an oscillating movement, in which second cylinder ZYL2 oscillates in its compression stroke and its intake stroke, and first cylinder ZYL1 correspondingly oscillates in its power stroke and its compression stroke.

Instead of the opening of the throttle valve, at opening point in time tauf, in the case of internal combustion engines having camshaft adjustment, instead the engine may switch over to a larger cam, for example, so that the air charge in intake cylinder ZYL2 increases. In the case of internal combustion engines having electrohydraulic valve adjustment, intake valve 160 of intake cylinder ZYL2 may be activated in such a way that it is open during the intake stroke of intake cylinder ZYL2, and the air charge in intake cylinder ZYL2 is thus increased.

Figure 3:
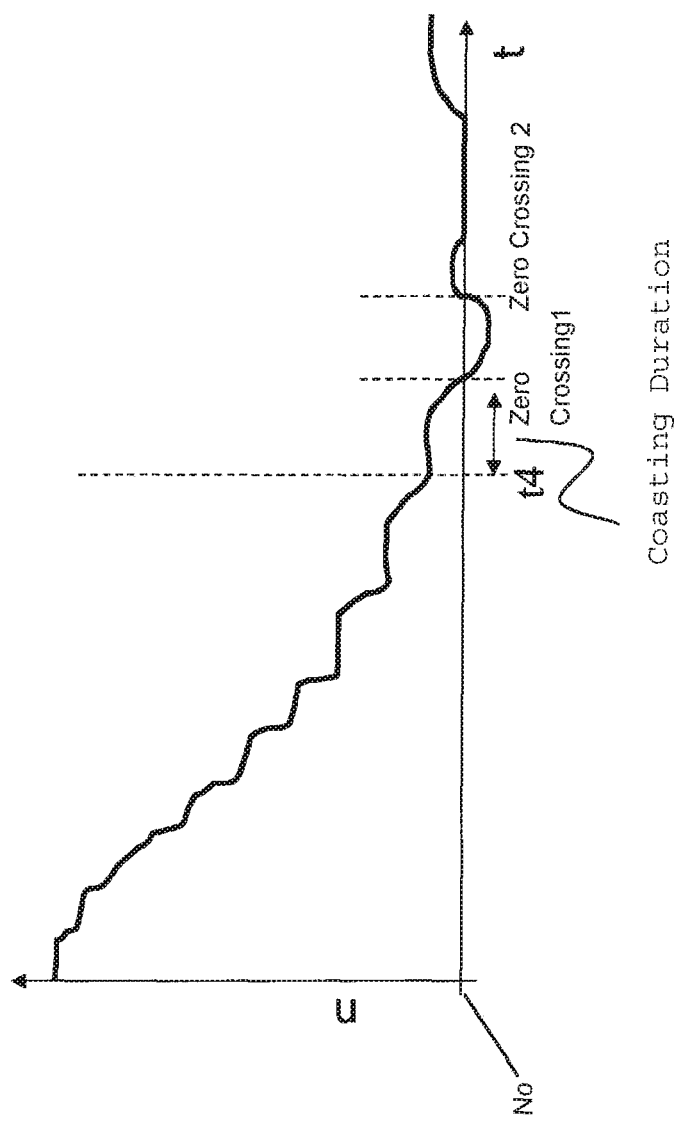
FIG. 3 shows the coasting behavior of the internal combustion engine.

FIG. 3 shows the time curve of speed n of the internal combustion engine during stopping and restarting. Speed n of the internal combustion engine decreases during a coasting phase in the way illustrated in FIG. 2b, and finally changes the sign when the rotational movement of the internal combustion engine reverses at swinging back point in time tosc illustrated in FIG. 2b. In an oscillating phase, the curve of speed n of the internal combustion engine travels through an oscillating curve until it drops consistently to zero at stopping point in time tstopp illustrated in FIG. 2b and remains there.

The zero crossings of speed n of the internal combustion engine, referred to hereafter with tein1 and tein2, represent typical engagement points in time of the starter. In this case, tein1 is a zero crossing of engine speed n in the case of forward rotation, and tein2 is a zero crossing in the case of reverse rotation. Tein1 is identical to swinging back point in time tosc. An engagement point in time may also be given in that the absolute value of speed n drops below an engagement speed threshold nein. In FIG. 3, nein is selected to be n=0. However, it may also be selected to be greater and in particular also as a function of the rotational direction, for example, n=80 RPM in the forward rotational direction or n=−30 RPM in the reverse rotational direction.

Coasting duration Taus, which is advantageously influenced using the method according to the present invention, is given in the exemplary embodiment, as illustrated in FIG. 3, as the time span between fourth point in time T4 and the first zero crossing of speed n of internal combustion engine tein1. Coasting duration Taus is therefore also given by the time span between fourth point in time T4 and swinging back point in time tosc.

Figure 4:
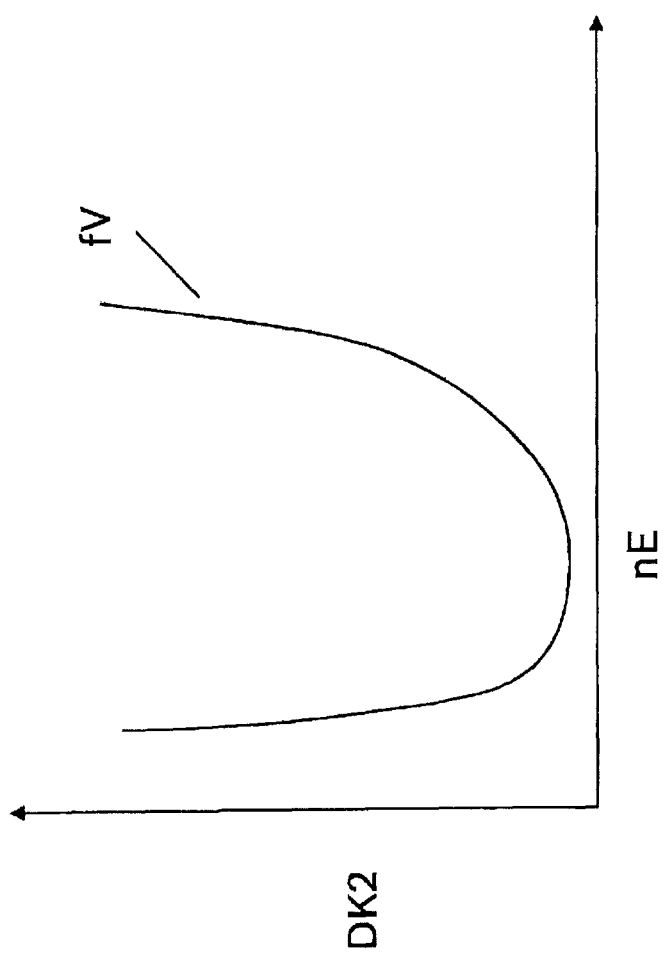
FIG. 4 shows the functional curve of the degree of opening of the air metering device as a function of the ascertained second speed.

FIG. 4 illustrates as an example the curve according to the present invention of second activation signal DK2 as a function of coasting speed nE.

The functional curve is identified with reference sign fV. For the sake of simplicity, reference is made hereafter to the degree of opening of throttle valve 100, and reference sign DK2 is also selected for this purpose. This may also stand in particular for an equivalent activation signal of the throttle valve or another air metering device. According to the present invention, the degree of opening of throttle valve DK2 decreases steeply in the case of low coasting speed nE, extends approximately constant with increasing coasting speed nE of the internal combustion engine, and then increases steeply in the case of even greater coasting speed nE of the internal combustion engine.

FIG. 5 illustrates the resulting curve of coasting duration Taus as a function of ascertained second speed nE. FIG. 5a illustrates the case in which degree of opening DK2 of throttle valve 100 is selected independently of coasting speed nE, for example, constant as equal to 15%. In this case, a large coasting duration Taus results in the case of small coasting speed nE, which, with increasing coasting speed nE, decreases, flattens, reaches a minimum, and finally increases steeply again in the range of greater coasting speed nE.

This behavior results from the combination of various physical effects. It may be understood qualitatively via the behavior of a spring pendulum having spring constant D and mass m. In the case of such a spring pendulum, period duration T of its oscillation is known to be given by the formula $$T \sim \sqrt{\frac{m}{D}}.$$

In the present case, spring constant D is given by the air charge in the cylinder, which decisively determines the force of the gas spring, and the inertia of the internal combustion engine, which is essentially similar to an inertial mass m, but is subjected to an angle dependence due to the coupling of piston 30 via connecting rod 40 to crankshaft 50. The inducted air mass is essentially determined by the degree of opening of throttle valve DK2, and additionally decreases at greater speed of the internal combustion engine, i.e., the force of gas spring D becomes less at greater speed of the internal combustion engine. Period duration T of the idealized spring pendulum model, and therefore also coasting duration Taus, therefore increases with greater coasting speed nE. If coasting speed nE thus increases, swinging back angle RPW of the internal combustion engine thus shifts toward greater angles.

In the case of swinging back angles RPW in the vicinity of the bottom dead center, a small stroke change of piston 30 requires a significantly increased change of the angle of crankshaft 50, i.e., more moment of inertia of the internal combustion engine is to be overcome per stroke change, which corresponds in the described model of the spring pendulum to an increase of mass m. Thus, the closer swinging back angle RPW is to bottom dead center, the greater mass m in the spring pendulum model, and according to the formula $$T \sim \sqrt{\frac{m}{D}},$$

the greater coasting duration Taus. Since swinging back angle RPW is closer to bottom dead center at lower coasting speed nE than at higher coasting speed nE, coasting duration Taus is thus greater in the range of lower coasting speed nE, the less coasting speed nE is.

FIG. 5b shows the curve of coasting duration Taus as a function of coasting speed nE when throttle valve angle DK2, as illustrated in FIG. 4, is selected as a function of coasting speed nE. At great coasting speed nE, the degree of opening of throttle valve DK2 is selected to be large, i.e., the air charge increases, which corresponds in the spring pendulum model to an increase of spring constant D, and therefore a decrease of coasting duration Taus. At moderate coasting speed nE, the degree of opening DK2 of the throttle valve is selected to be relatively small, which results in a smaller air charge in the combustion chamber of cylinder ZYL2, and therefore in the spring pendulum model in a decreased spring constant D, which results in an increase of coasting duration Taus.

The characteristics shown in FIG. 5a, which result in the procedure as in the related art, are compensated for as shown in FIG. 5b by the method according to the present invention, so that a linearly decreasing relationship results between coasting duration Taus and coasting speed nE. Such a linear relationship is particularly advantageous for the simplest possible production of the closest possible engagement point in time. However, a different curve is also conceivable, it being advantageous for the purpose of a robust implementation in a digital control and/or regulating unit if the derivative of the functional curve of coasting duration Taus over coasting speed nE remains in a preferably narrow range, for example, characterized by a formula $$\left|\frac{dTaus}{dnE}\right| < K,$$

K being a definable threshold value.

FIG. 6 describes the sequence of the method according to the present invention. In a step 1000, a stopping request by the driver is recognized, and measures for stopping the engine are initiated. The behavior of a decreasing speed n illustrated in FIG. 2 results. In step 1010, which now follows, it is checked—preferably periodically during the passage of top dead centers—whether speed n has fallen below predefinable speed threshold value ns. Step 1010 is repeated until this condition is met. If it is met (this corresponds to second point in time t2 in the case illustrated in FIG. 2), coasting speed nE is established as speed n ascertained at this point in time. It therefore characterizes the kinetic energy of the rotational movement of the internal combustion engine at the point in time at which coasting speed nE was ascertained. Step 1020 follows, in which the intake cylinder is ascertained, and opening crankshaft angle KWauf, at which the throttle valve is opened, is established. Second opening value DK2 is also ascertained as illustrated in FIG. 4 according to functional curve fV from coasting speed nE. Step 1030 follows.

Step 1030 follows, in which it is checked whether crankshaft angle KW of intake cylinder ZYL2 has exceeded opening crankshaft angle KWauf. This opening crankshaft angle KWauf may be in the vicinity of third dead center T3, for example, as described. Step 1030 is repeated until this condition is met. Step 1040 follows as soon as the condition is met.

In step 1040, the throttle valve is opened to second opening value DK2, as illustrated in FIG. 2c. Step 1050 follows, in which, based on determined coasting duration Taus, the information is available at which point in time starter 200 may engage, in order to engage in the case of a starting request by the driver. An engagement is therefore possible with the least possible delay. The method according to the present invention ends thereby.

What is claimed is:

1. A method for stopping an internal combustion engine, comprising:
   supplying an air flow via an air metering device of the internal combustion engine;
   after a stopping requested is ascertained;
      reducing the air flow supplied by the air metering device after the stopping request has been ascertained;
      ascertaining an undershoot point in time, the undershoot point in time being a point in time at which an ascertained speed of the internal combustion engine falls below a predefinable speed threshold value; and
      after the undershoot point in time;
      ascertaining a coasting speed of the internal combustion engine, the coasting speed being a speed of the internal combustion engine at a point in time when an intake cylinder of the internal combustion engine is at a top dead center following the underfoot point in time;
   selecting a degree of opening of the air metering device as a function of the coasting speed of the internal combustion engine; and
   increasing the air flow supplied via the air metering device by adjusting the air metering device to the selected degree of opening;
   wherein the predefined speed threshold is selected in such a way that an intake cylinder no longer enters a power stroke after the increase of the supplied air flow until the internal combustion engine is at a standstill.

2. The method as recited in claim 1, wherein the air metering device includes a throttle valve of the internal combustion engine.

3. The method as recited in claim 1, wherein the degree of opening is selected as a function of the air metering device in such a way that a monotonously decreasing relationship results between the coasting speed and a coasting duration, the coasting duration being a duration between a point in time at which the intake cylinder enters the final compression stroke and a swinging back point in time.

4. The method as recited in claim 3, wherein the degree of opening is selected as a function of the air metering device in such a way that a linearly decreasing relationship results between a variable, which characterizes the coasting speed, and the coasting duration.

5. The method as recited in claim 4, wherein the variable which is characterized by the coasting speed is the coasting speed.

6. The method as recited in claim 4, wherein the variable which is characterized by the coasting speed is a kinetic rotational energy of the internal combustion engine.

7. The method as recited in claim 4, wherein the variable which is characterized by the coasting speed is a polynomial of the coasting speed.

8. The method as recited in claim 3, wherein the swinging back point in time occurs when the absolute value of the ascertained speed of the engine drops below an engagement speed threshold.

9. The method as recited in claim 1, wherein a functional curve of the degree of opening of the air metering device as a function of the coasting speed meets at least the following conditions:
   when the coasting speed falls:
      in a first range of coasting speeds having a first maximum speed, the degree of opening as a function of the coasting speed decreases,
      in a second range of the coasting speeds ranging from a second minimum speed, which is greater than the first maximum speed, to a second maximum speed, the degree of opening as a function of the coasting speed is approximately constant, and
      in a third range of the coasting speeds having a third minimum speed, which is greater than the second maximum speed, the degree of opening as a function of the coasting speed increases.

10. The method as recited in claim 1, further comprising:
    starting an opening of the air metering device to the selected degree of opening after an air intake valve of the intake cylinder is open.

11. The method as recited in claim 1, further comprising:
    starting an opening of the air metering device to the selected degree of opening at a time when a crankshaft of the intake cylinder is a priority angle theta before a next top dead center of the intake cylinder, the next top dead center following the top dead center that follows the undershoot point in time.

12. The method as recited in claim 11, wherein the internal combustion engine includes at least two intake cylinders including the intake cylinder and an additional intake cylinder, and wherein the priority angle theta is selected so that the intake cylinder enters an intake stroke before the additional intake cylinder is closed.

13. The method as recited in claim 1, wherein the internal combustion engine includes at least two intake cylinders including the intake cylinder and an additional intake cylinder.

14. The method as recited in claim 1, further comprising:
    establishing an opening crankshaft angle; and
    starting an opening of the air metering device to the selected degree of opening when an angle of the crankshaft of the intake cylinder has exceeded the established opening crankshaft angle.

15. The method as recited in claim 1, wherein a functional curve is pre-established and provides, based on the set coasting speed, an activation signal that indicates the degree of opening of the air metering device.

16. The method as recited in claim 15, wherein the functional curve is selected if a derivative of the functional curve of the coasting duration over the coasting speed is less than a definable threshold value.

17. The method as recited in claim 1, wherein the degree of opening of the air metering device is selected to be:
- a first value when the set coasting speed is a first value, or
- a second value that is less than the first value when the set coasting speed is a second value that is less than the first value.

18. The method according to claim 1, wherein the top dead center following the undershoot point in time at which the coasting speed is ascertained is the first top dead center following the undershoot point in time.

* * * * *